J. K. MILLER.
Plumber's Trap.
No. 216,288.   Patented June 10, 1879.
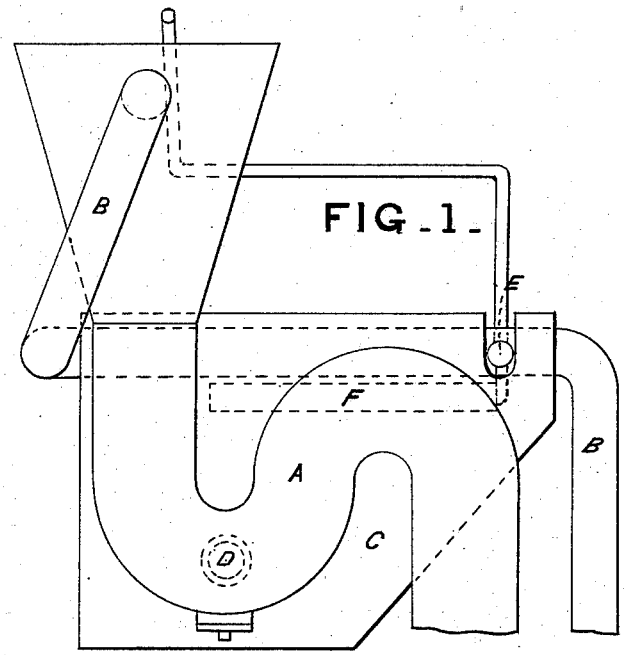
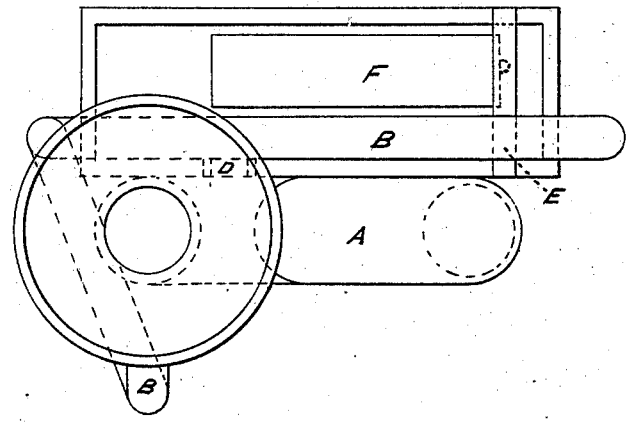
WITNESSES.
Augustus Hurd
William J. Copeland
INVENTOR.
James K. Miller
Per G. Stackpole
Atty

UNITED STATES PATENT OFFICE.

JAMES K. MILLER, OF NEW YORK, N. Y.

IMPROVEMENT IN PLUMBERS' TRAPS.

Specification forming part of Letters Patent No. 216,288, dated June 10, 1879; application filed November 12, 1878.

*To all whom it may concern:*

Be it known that I, JAMES K. MILLER, of New York city, in the county and State of New York, have invented certain new and useful Improvements in Plumbers' Traps, which improvements are fully set forth in the following specification and accompanying drawings, in which—

Figure 1 is a side elevation of my improved plumber's trap. Fig. 2 is a top or plan view thereof.

A is the curved pipe which forms the trap. B is the water-supply pipe. C is a tank, which is connected to the pipe A by an opening, D, so that the water flows through from the tank to the trap. The opening D is placed at the bottom of the trap, so that any sediment that would otherwise stand in the bottom of the trap will be forced upward over the bend, the current being from the tank to the bottom of the S-trap and upward over the bend, thus effectually preventing the clogging of the trap, and thereby damage by overflow.

The advantage of this plan over the old, where the trap is washed out only by the forcing of the water down from the top of the trap, will be readily seen.

The opening from the tank to the trap being at the bottom of the trap, the water in the tank and trap is necessarily always at the same level, and, the trap being open at both ends and valveless, there is always a free passage through it, while it is always kept full of water without danger of overflow, and yet without the necessity of the overflow-pipe which exists in many others, and which defeats one of the principal objects, as in the Conron patent.

The passage L allows the gases to pass freely from the soil-pipe into the room. In my plan there is no passage for the gases from the soil-pipe to the room unless they pass through the water.

The supply-pipe is provided with a valve, E, which is directly over the tank C. A float, F, is so attached to the valve that when the tank C is full the float rises with the water and closes the valve; but as soon as the water begins to lower the valve is opened by the lowering of the float, giving a fresh supply of water. Consequently the tank is always kept full of water by the automatic action of the valve; and as the tank and trap-pipe are connected and provided with the opening D between them at the bottom of the trap, the water in each is always at the same level.

It will thus be readily seen that it is impossible for this trap to be emptied by siphoning, as the moment the suction commences to lower the water it is automatically supplied by the combined action of the float F and valve E.

The object of my invention is to produce a plumber's S-trap for all purposes for which a stench-trap is used, and that cannot be siphoned, and to so place the valve that any leakage will be caught by the tank.

The valve E may be connected with the pull-wire in the ordinary way, and is entirely sealed by water, no valve being used and no waste-pipe being necessary, as in others, there being with my improvement no danger of overflow.

My improvement is especially intended to be used in combination with the S-trap.

The pull-handle is to be connected directly with the float, so that by the handle being used the float and valve are always kept in working order.

Having thus described my invention, what I claim as new, and desire to secure by Letters Patent, is—

1. The combination, with an S-trap, A, of the tank C, they being connected by a pipe or opening, D, at the bottom of the S-trap A, substantially as and for the purpose set forth.

2. The tank C, provided with the supply-pipe B, valve E, and float F, combined with an S-trap, A, substantially as and for the purpose set forth.

3. In combination with the S-trap A and tank C, connected as set forth, the arrangement of the valve E in the supply-pipe B, directly over the tank, substantially as and for the purpose set forth.

4. The combination of the S-trap A, the tank C, and valve E, float F, and supply-pipe B, the pull-handle connected directly to the float, the parts all being constructed, combined, and operating substantially as and for the purpose set forth.

JAMES K. MILLER.

Witnesses:
JOHN R. MCLEAN,
AUGUSTUS HURD.